June 24, 1930. J. H. FOX ET AL 1,765,829
APPARATUS FOR MAKING COMPOSITE GLASS
Filed Aug. 1, 1928  5 Sheets-Sheet 5
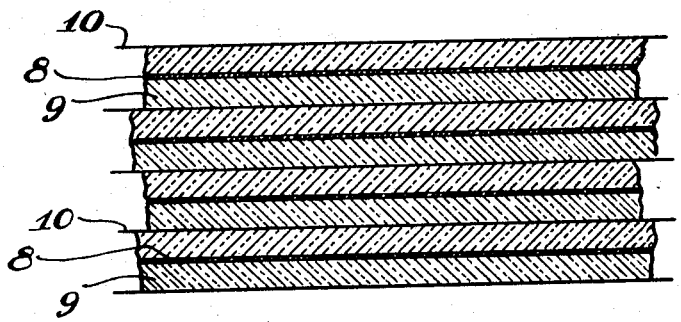
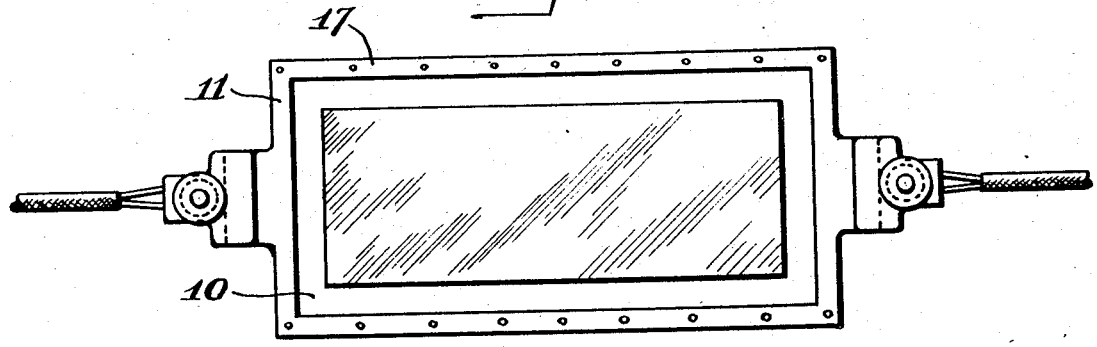
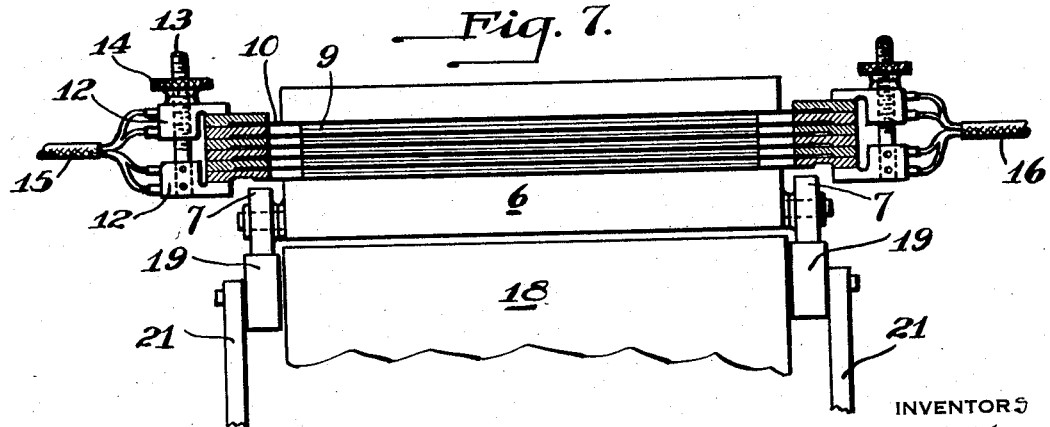
INVENTORS
John H. Fox
and
Wm. Owen
by
James Bradley
attys Patented June 24, 1930

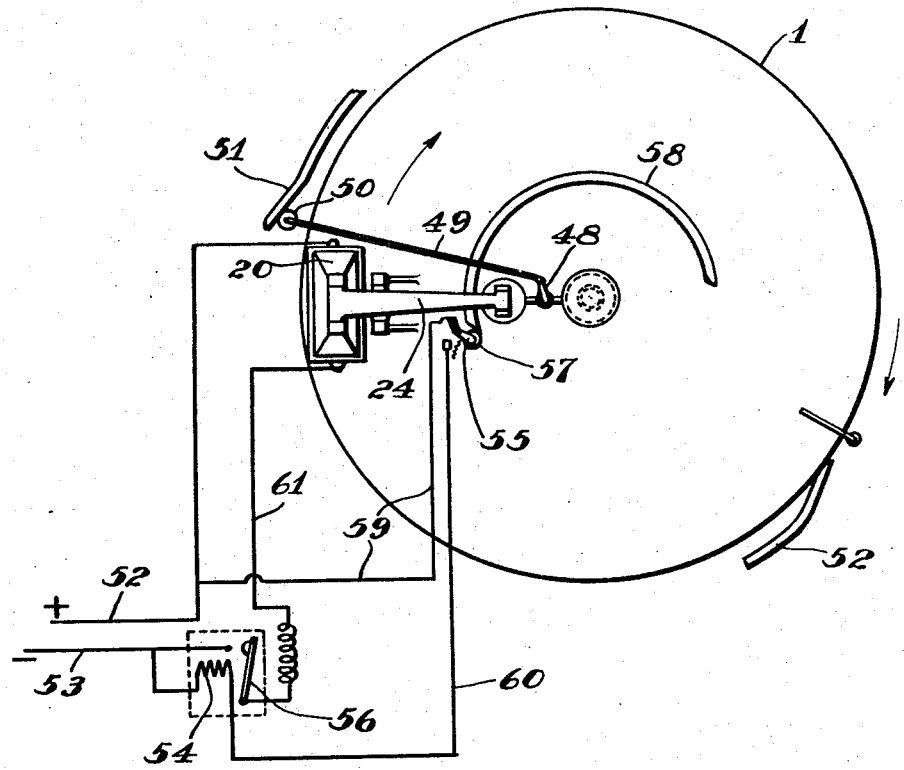

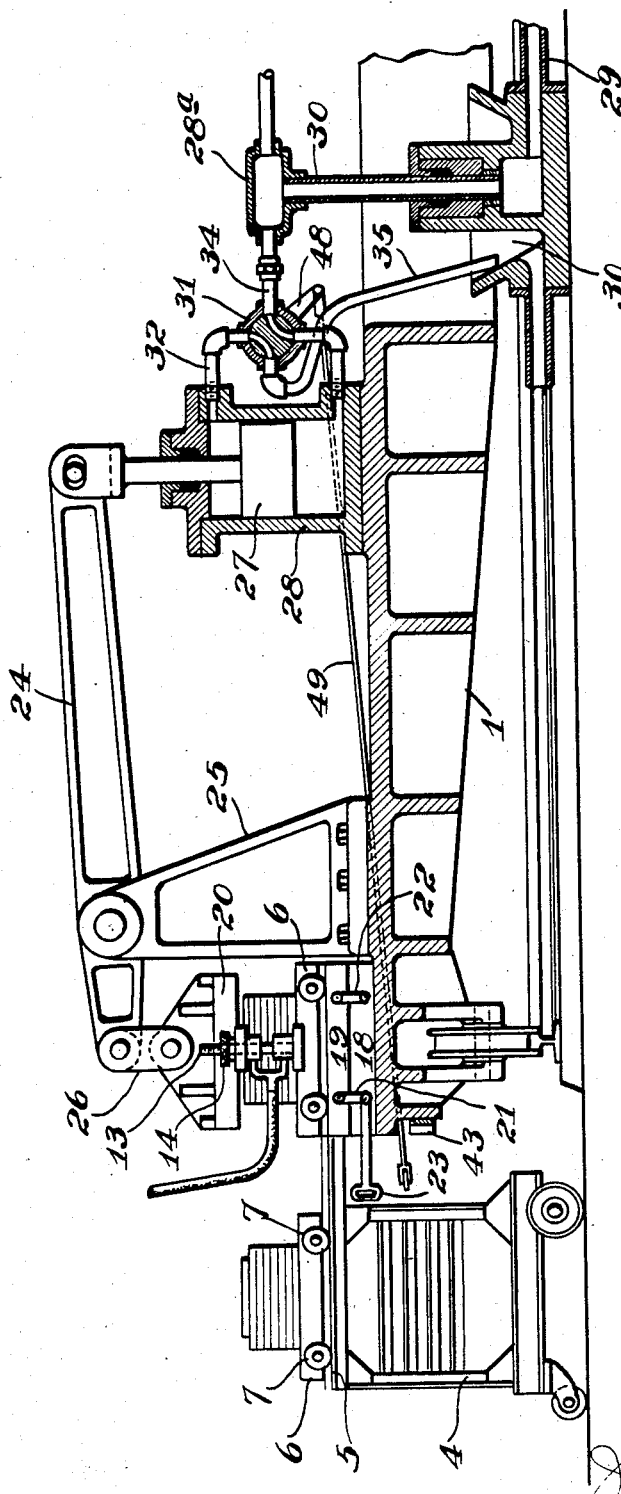

1,765,829

UNITED STATES PATENT OFFICE

JOHN H. FOX AND WILLIAM OWEN, OF PITTSBURGH, PENNSYLVANIA, ASSIGNORS TO PITTSBURGH PLATE GLASS COMPANY, A CORPORATION OF PENNSYLVANIA

APPARATUS FOR MAKING COMPOSITE GLASS

Original application filed December 17, 1926. Serial No. 155,424. Divided and this application filed August 1, 1928. Serial No. 296,778.

Figure 1:
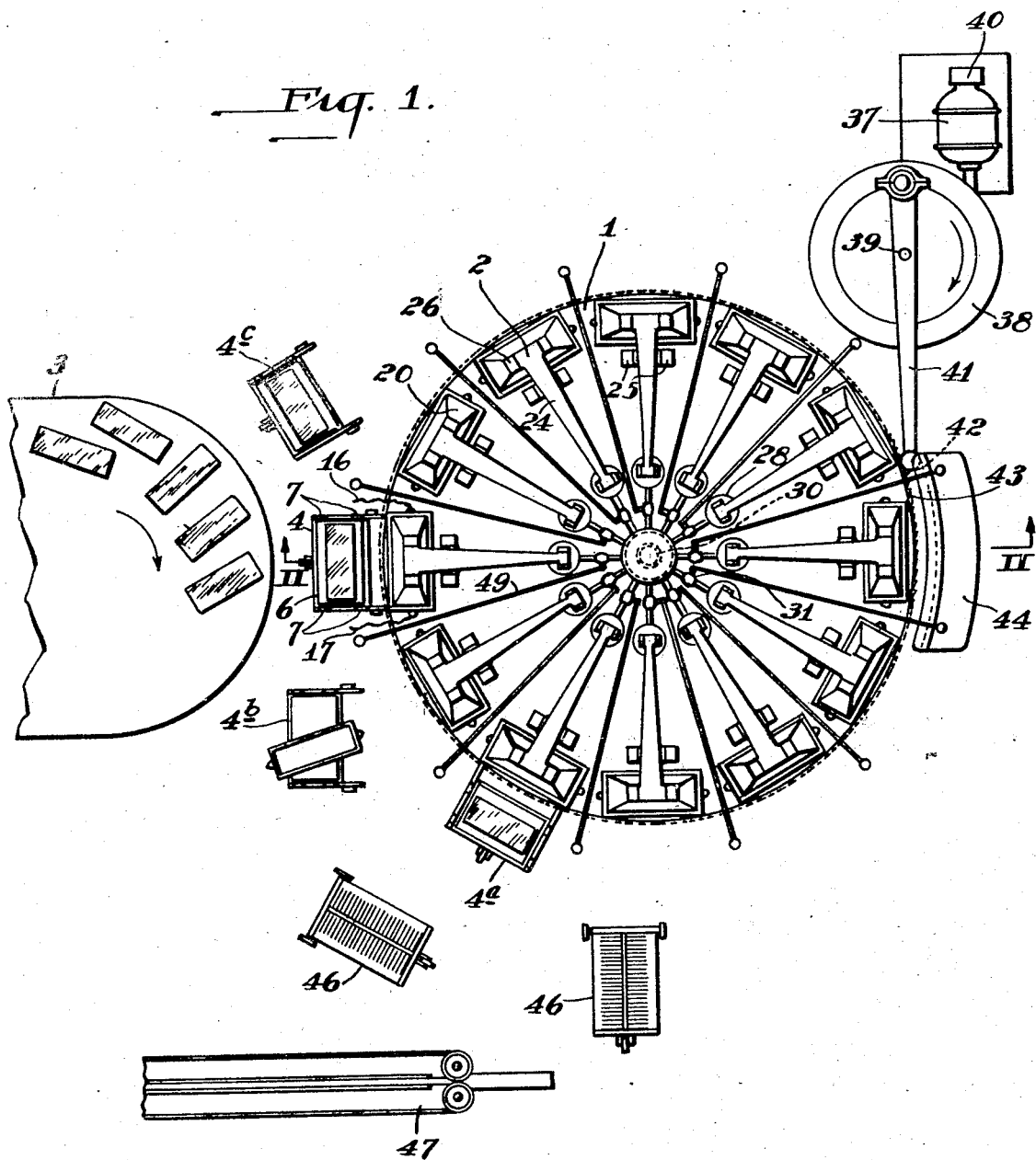
Figure 2:
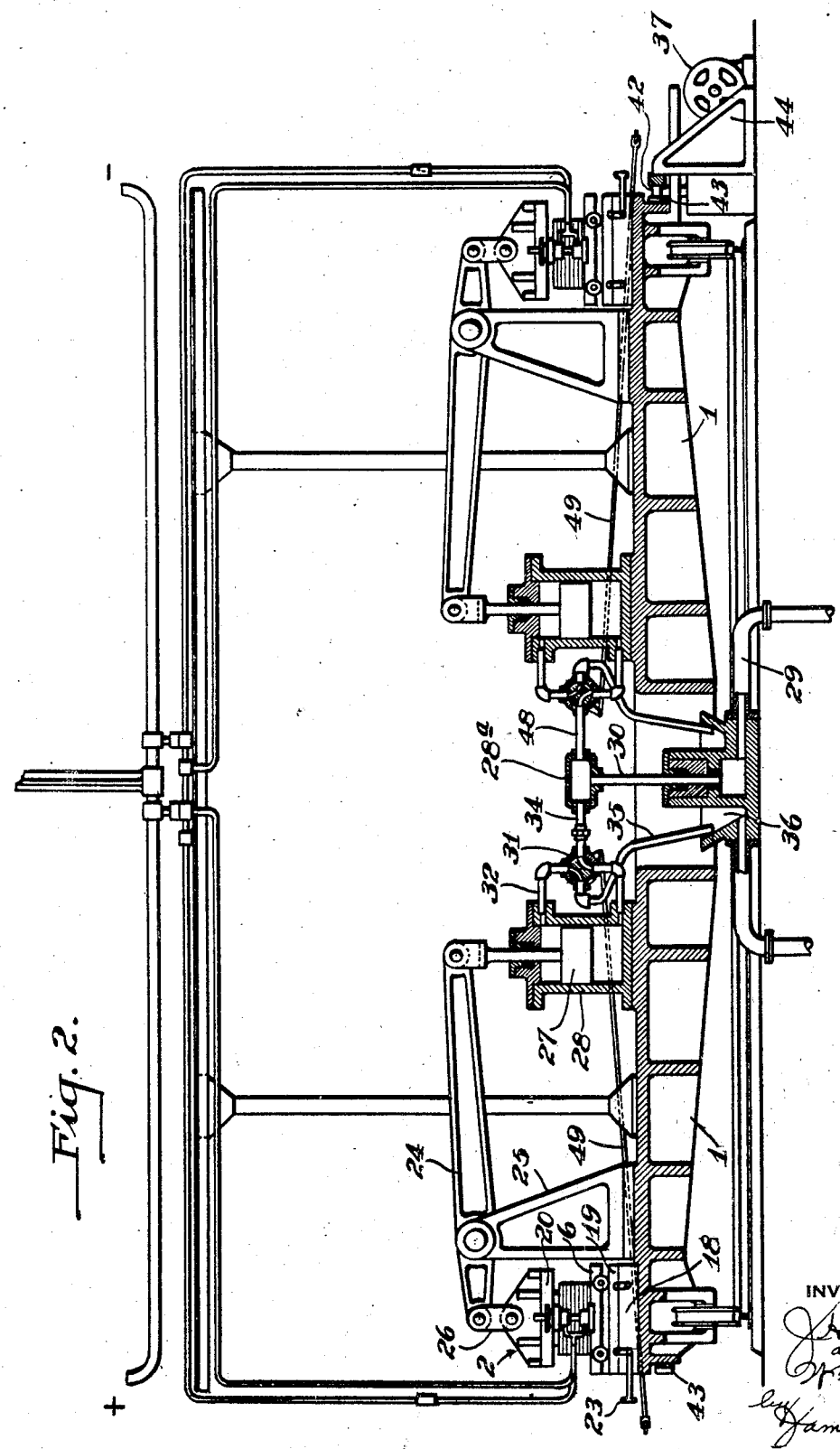

The invention relates to an apparatus for making composite glass, and particularly to means for applying heat and pressure to cause the joinder between the glass and celluloid, the present application constituting a division of our application, Serial No. 155,424, filed Dec. 17, 1926. Composite glass ordinarily comprises two sheets of glass with a sheet of celluloid cemented therebetween, although a greater or less number of layers of material may be employed. It is preferred to assemble the sheets with a coating of cement, such as gelatin, dried upon the surfaces of the glass which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, and the invention may be employed in such way, if desired. The invention has for its primary objects the provision of a means and procedure whereby a plurality of composite plates may be formed simultaneously, and whereby quantity production may be secured with a limited number of operatives. One embodiment of the invention is illustrated in the accompanying drawings, wherein:

Figure 1 is a plan view of the apparatus. Fig. 2 is a transverse section on the line II—II of Fig. 1. Fig. 3 is a diagrammatic plan view showing the automatic means for operating the parts, and including the wiring diagram. Fig. 4 is an enlarged transverse section through a part of the apparatus. Fig. 5 is a partial section through a stack of the composite plates and the heating elements arranged for the pressing operation. Fig. 6 is a plan view of one of the heating elements with a sheet of glass imposed thereon. And Fig. 7 is a vertical section through a stack of plates and the heating elements as arranged upon the transfer carriage.

In carrying out the process, the sheets of glass and celluloid which are to be formed into the composite plates, are brought into position opposite the turntable 1 carrying the series of presses 2 by means of the rotatable work table 3. These plates have been previously prepared as set forth in our copending application, Serial No. 155,452, filed Dec. 17, 1926. This treatment involves a cleaning of the glass and celluloid plates and a treatment of one side of each of the glass sheets with a thin film of gelatin or other cement. This cement is of such a character that when a celluloid sheet is placed between two glass sheets and heat and pressure applied thereto, the cement will be softened and the sheets securely attached together when the composite plate thus formed has cooled off. If gelatin is used as a cement, the temperature employed will ordinarily be about 250 degrees and the pressure about 150 pounds per square inch.

In order to make the operation a multiple one to form a number of composite plates at the same time, the sheets are arranged in a stack with alternating heating elements, as indicated in Figs. 4 and 5, either upon the table 3 or upon a work table 4. This table 4 is provided with a runway 5 carrying the charging car 6 whose wheels 7 engage the runway. As shown in Figs. 5 and 7, the stack of sheets is built up to form four and five composite plates, each consisting of two sheets of glass and one of celluloid, but this number may be increased or decreased as desired. By reference to Fig. 5, it will be seen that there is a sheet of celluloid 8 between each pair of glass sheets 9, the faces of the glass sheets engaging the celluloid being coated with the gelatin in dry condition, as heretofore referred to. Between each pair of composite plates thus provided is a heating element 10, such heating element in the present instance consisting of a sheet of high resistance metal; such as, nichrome, (nickel chromium alloy). Other similar resistance plates are also provided at the top and bottom of the stack, so that each composite sheet is exposed to heating action from its two sides. When pressure is applied to the stack of composite plates in the press, as hereafter described, the heating of the stack is accomplished by directing a current of electricity through the plates 10. As indicated in Fig. 6, the nichrome plates are of greater area than the glass plates and are provided at their ends with copper strips 11 which engage each other when the parts are stacked, as indicated in Fig. 7. At this time, the parts are securely clamped together by means of the members 12, 12. The lower member 12 has pinned therein the vertical screw 13 which extends through the upper member 12, and carries at its upper end the clamping nut 14. These clamps are connected to the electric terminals 15 and 16. In order to stiffen the nichrome plates 10 which are of very thin metal, the strips of bakelite 17 are preferably employed riveted to the edges of the plates. In order to prevent any scratching of the faces of the glass plates incident to their contact with the nichrome plates, thin sheets of asbestos paper or other protecting means may be interposed between the faces of the glass plates and the nichrome plates. It will be understood that the invention in its broad aspect is not limited to the use of the resistance plates as heating elements, as any other desired means may be interposed for this purpose, such, for instance, as the steam heated plates shown in our copending application, Serial No. 155,425, filed Dec. 17, 1926.

The table 4 which carries the stack of plates is mounted upon wheels and is positioned so that the runway 5 abuts against one of the supporting anvils 18 carried by the turntable 1 and forming a part of each of the presses. This anvil has a pair of vertically movable track members 19, 19 at its sides (Fig. 7) and when the runway 5 is brought into alignment with the track members 19, 19, the car 6 carrying the stack of plates is moved to the right (Fig. 4) into position beneath the press head 20. The track members 19 are supported upon two pairs of links 21 and 22 pivoted to the framework of the turntable at their lower ends and to the track members at their upper ends. The links 21 are provided with the arms 23 extending at right angles to the links and adapted to be moved up and down to raise and lower the track members 19. When the links 21 and 22 are in the vertical position shown, the track members 19 are in their upper positions, and when the arms 23 are lifted, the links are swung to the right (Fig. 4) lowering the track members 19 so that the carriage 6 engages the top of the anvil 18, thus giving a rigid support for the stack of plates during the pressing operation.

Each of the press heads is operated by means of a lever 24 pivoted upon the stand 25 and connected to the head by means of the link 26. The rear end of the lever is operated by the plunger 27 working in the cylinder 28. All of the cylinders are supplied with liquid under pressure from the revolving header 26ª, such header having connection with the supply pipe 29 by means of the pipe 30. A four-way valve 31 is provided in the piping 32, such valve being shown in position to admit fluid to the lower end of the cylinder 28 and thus cause the head 20 to move downward and apply the necessary pressure to the stack of plates. At this time, the upper end of the cylinder is in communication with the drain pipe 35.

As illustrated, the turntable 1 is provided with twelve presses which are successively brought into position opposite the table 4 and are loaded at this point with stacks of plates preliminary to the pressing operation. The apparatus is so arranged that after heat and pressure are applied to one of the presses by means of the apparatus heretofore described, the turntable makes about one-half revolution before the pressure is released and before the flow of current through the heating plates is discontinued. The application and release of pressure is preferably accomplished automatically by means of the rotation of the table and the application and cut off of current is similarly made automatic, the means whereby this is accomplished being later described. The rotation of the table is preferably accomplished from the electric motor 37 (Fig. 1) which rotates the crank disc 38 through the intermediary of a worm on the motor shaft which engages a suitable worm wheel carried by the shaft 39 of the crank disc. A suitable brake 40 is provided for giving an abrupt stoppage of the motor when the current thereto is discontinued. The crank disc is provided with a crank rod 41 whose end carries a spring pressed dog 42 in engagement with a suitable rack 43 extending around the periphery of the turntable 1. The outer end of the crank rod is guided so that the dog is kept in engagement with the rack by means of the guide shoe 44. The stroke of the crank rod is such that the turntable 1 is moved one-twelfth of a revolution for each complete movement of rotation of the crank disc. The operation of the motor is under the control of the operator standing adjacent the table 4, a suitable switch or push button being located adjacent such point. The turntable is rotated in a clockwise direction (Fig. 1) and when it has nearly completed its rotation, the stacks of plates are removed upon the table 4ª, which is similar in all respects to the table 4, being provided with a runway or track for the cars which carry the plates. At this time, the links 21 and 22 are, of course, operated to raise the tracks 19 into contact with the wheels of the car so that it may be easily rolled out upon the table 42. The plates constituting the stacks are by this time relatively cool so that they may be easily handled when the stacks are disassembled upon the table 4ª. As the stacks are disassembled upon the table, the plates are removed and placed upon suitable trucks 46 which convey them to the machine for rounding the edges, the end of such machine being indicated at 47. The tables 4 and 4ª are provided with wheels, as indicated in Figs. 1 and 4, so that after the stack of plates is removed therefrom, the table may be moved back to starting position and a new stack of plates placed thereupon in assembled position ready to take the place of the table 4 when such table has been emptied by moving its car into the press. Two additional tables 4ᵇ and 4ᶜ similar to the tables 4 and 4ª are shown adjacent the turntable ready to receive packs of plates preliminary to the pressing operation.

The arrangement for operating the valves 31 automatically and for controlling the application of current to the nichrome plates automatically is shown diagrammatically in Fig. 3 in which a single press 2 is illustrated as applied to the turntable 1. The handle 48 of the valve 31 is provided with an operating rod 49 carrying a roller 50 at its outer end and this roller is adapted to engage the cam 51 when the table moves ahead in a clockwise direction. The movement of the rod 49 to the right opens the valve 31 admitting pressure beneath the plunger 27 (Fig. 4) and thus causing the presser head 20 to move downward and apply pressure to the stack of sheets upon the anvil or base 18. This condition of pressure exists during the rotation of the table 1 through approximately 180 degrees, at which time the valve roller passes beneath the cam 52, thus moving the valve rod 19 outward and shifting the valve 31 so that the fluid pressure on the lower side of the plunger 37 is released and pressure is applied to the upper side of such plunger causing the press to open. Current is applied to the nichrome plates from the lines 52 and 53 which have a relay coil 54 in shunt arranged to be closed and opened by the switch 55 carried by the turntable. The circuit through the nichrome plates between the lines 52 and 53 is controlled by the relay arm 56 which is adapted to be closed when the coil 54 is energized. The switch 55 is open when the press is in the position shown, but after such press is loaded and the turntable begins its movement, the roller 57 of the switch arm 55 engages the end of a fixed cam 58 causing the switch to close and complete the circuit through the wires 59 and 60 and the coil 54. This causes the arm 56 to close, completing the circuit between the lines 52 and 53, which circuit includes the wire 61 and the arm 56. The nichrome plates are thus heated by a flow of current and this heat condition is maintained until the roller 57 passes off of the other end of the cam 58, at which time, the switch opens, causing the relay to operate to break the circuit through the nichrome plates. The stack of plates, therefore, commences to cool down at this point in the revolution of the table, and sufficient cooling has been effected by the time the stack reaches the table 4ª to permit of the disassembling of the pack. Each press, of course, has its automatic operating mechanism as above described, thus reducing the labor incident to the operation to a minimum.

What I claim is:

1. Apparatus for applying heat and pressure to a plurality of sets of glass sheets and reinforcing layers therebetween, comprising a carrier mounted for movement, a power press carried thereby, having a fixed base and a vertically movable top to which the pressing power is applied, a track mounted on the carrier transversely thereof beneath the top, an assembling table at one side of the carrier, a runway on the assembling table with which said track is aligned by the movement of the carrier, and a car on said runway on which the sheets to be pressed are stacked, the said track being mounted for vertical movement so that after the car is positioned beneath the press top, it may be lowered to bring its body portion into engagement with said fixed base.

2. Apparatus for applying heat and pressure to a set of glass and celluloid plates, comprising a rotatable table, a power press carried thereby, having a fixed base and a vertically movable top to which the pressing power is applied, a track carried by the table and extending beneath said top, an assembling table at one side of the rotatable table, a runway on the assembling table with which said track is aligned by the rotation of said first table, and a car carried on said runway on which the sheets to be pressed are stacked, the said track being mounted for vertical movement, so that after the car is positioned beneath the press top, it may be lowered to bring its body portion into engagement with said fixed base.

JOHN H. FOX.
WILLIAM OWEN.